Patented Aug. 12, 1941

2,252,414

UNITED STATES PATENT OFFICE 2,252,414

SOLDER

August H. Riesmeyer, Collinsville, Ill., assignor to Aluminum Company of America, Pittsburgh, Pa., a corporation of Pennsylvania No Drawing. Original application December 29, 1939, Serial No. 311,597. Divided and this application January 15, 1941, Serial No. 374,594

3 Claims. (Cl. 75—175)

This invention relates to a soft solder composition, and it is especially concerned with a solder which is adapted for use in the joining of aluminum parts.

The metals tin and zinc have been extensively used in the past for making low melting point solders. The relative amounts of these metals in the solders have been varied to meet different requirements as to melting point, fluidity, resistance to corrosion, etc. A special problem has arisen in the case of soldering aluminum because of the difficulty of penetrating the metal oxide film which coats the metal, and the electrolytic corrosion which sometimes occurs between the solder metal and the aluminum when the soldered assembly is exposed to a corrosive environment. The penetration and removal of this oxide film preparatory to soldering can generally be accomplished most expeditiously by applying a flux to the area to be soldered just prior to bringing the molten solder into contact with the metal surface. The corrosion resistance of the soldered joint in the absence of any flux residue, however, depends upon the composition of the solder. Among soft solders which produce the most corrosion resistant bonds are those which contain more than 80 per cent tin, and are therefore known as "high tin solders."

Although high tin solders have been used for soldering aluminum, they do not take hold or "bite" the aluminum very readily, even when employed with a flux. In other words, the solder does not rapidly unite with the aluminum even though the oxide film has been removed. This deficiency is perhaps caused in part by the almost complete insolubility of tin in solid aluminum. For many soldering operations, especially those performed by machines, it is important to form a soldered joint as rapidly as possible, and it is therefore necessary to employ both a quick acting flux and a solder which will rapidly unite with the aluminum or other metal being soldered.

It is an object of my invention to provide a high tin solder which will rapidly unite with aluminum when melted and brought into contact with the aluminum. Another object is to provide a low melting point tin solder which has an improved biting power while retaining a satisfactory resistance to corrosion. These and other objects will become apparent from the description of the invention set forth hereinbelow.

My invention is predicated upon the discovery that the addition of either 0.05 to 0.5 per cent manganese or 0.1 to 0.5 per cent nickel, or both metals within these proportions, to a high tin solder composed of tin and zinc greatly increases the speed with which a soldered joint can be made, especially where aluminum is being soldered. The addition of such small amounts of nickel or manganese does not alter the melting point of the solder, nor does it substantially affect the resistance to corrosion of the soldered joint. Within the foregoing ranges, nickel and manganese have the same effect upon the solder with respect to increasing the speed with which the molten solder bites or unites with the metal being soldered. For this reason, these elements are considered to be equivalent to each other, and thus for the purpose of my invention they are regarded as constituting the group of equivalent elements.

The solder base which is improved by the addition of nickel and/or manganese consists of about 2.5 to 10 per cent zinc, the balance being tin. This solder should be free from copper, except as an unavoidable impurity, because of the formation of high melting point intermetallic compounds which make the solder sluggish. The proportions of zinc which are used in the solder are determined by the character of the metal parts being joined and the melting point desired. Generally, it is preferable to use between 8 and 10 per cent zinc if the lowest melting point combination is desired. However, for other reasons, it may be desirable to employ only from 3 to 5 per cent zinc. Some preferred compositions are 91.8 per cent tin, 8.0 per cent zinc, 0.2 per cent nickel; or 94.8 per cent tin, 5.0 per cent zinc, 0.1 per cent nickel, and 0.1 per cent manganese; or 91.8 per cent tin, 8.0 per cent zinc, and 0.2 per cent manganese.

Although the solder compositions described hereinabove are adapted for soldering common metals, such as copper, iron, and brass, it finds particular application in the joining of aluminum and aluminum base alloys. The solder has a sufficiently low melting point to be easily applied with the usual soldering tools, and in combination with a suitable flux, a sound soldered joint can be quickly produced. Some satisfactory fluxes for preparing an aluminum surface for soldering are those containing chlorinated naphthalene, diphenyl or dichlorbenzene described in Letters Patents of the United States 1,996,360, 1,996,361, and 1,996,362, and those containing an amine and a fluorine-containing compound, such as described in copending United States applications, Serial Nos. 306,887 and 306,888.

In referring to the soldering of aluminum, it is to be understood that the term "aluminum" is here used to include both the pure metal and aluminum base alloys, since both exhibit the same oxide film-forming characteristics.

This application is a division of my copending application, Serial No. 311,597, filed December 29, 1939.

I claim:

1. A solder composition consisting of 2.5 to 10 per cent zinc, 0.1 to 0.5 per cent nickel, 0.05 to 0.5 per cent manganese, and the balance tin.

2. A solder composition consisting of 8 to 10 per cent zinc, 0.1 to 0.5 per cent nickel, 0.05 to 0.5 per cent manganese, and the balance tin.

3. A solder composition consisting of 3 to 5 per cent zinc, 0.1 to 0.5 per cent nickel, 0.05 to 0.5 per cent manganese, and the balance tin.

AUGUST H. RIESMEYER.